United States Patent
Biezuner et al.

(10) Patent No.: US 11,768,621 B2
(45) Date of Patent: Sep. 26, 2023

(54) LIVE DATA MIGRATION IN DOCUMENT STORES

(71) Applicant: GONG.io Ltd., Ramat Gan (IL)

(72) Inventors: Erez Biezuner, Tel Aviv (IL); Zohar Shay, Even Yehuda (IL)

(73) Assignee: GONG.IO LTD., Ramat Gan (IL)

( * ) Notice: Subject to any disclaimer, the term of this patent is extended or adjusted under 35 U.S.C. 154(b) by 58 days.

(21) Appl. No.: 17/457,830

(22) Filed: Dec. 6, 2021

(65) Prior Publication Data

US 2023/0176761 A1 Jun. 8, 2023

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
See application file for complete search history.

(56) References Cited

U.S. PATENT DOCUMENTS

| | | | | |
|---|---|---|---|---|
| 6,591,269 B1* | 7/2003 | Ponnekanti | ......... | G06F 16/2246 |
| 10,467,309 B2 | 11/2019 | Riley et al. | | |
| 2009/0037366 A1* | 2/2009 | Shankar | .............. | G06F 16/2272 |
| 2012/0144110 A1* | 6/2012 | Smith | ................... | G06F 3/0607 |
| | | | | 711/E12.001 |
| 2016/0132542 A1* | 5/2016 | Li | ........................ | G06F 16/2365 |
| | | | | 707/696 |
| 2017/0109384 A1* | 4/2017 | Zhu | ..................... | G06F 16/2228 |
| 2019/0266271 A1 | 8/2019 | Leau | | |
| 2019/0325033 A1* | 10/2019 | Liu | ..................... | G06F 16/2365 |
| 2019/0384751 A1* | 12/2019 | Pierce | ................. | G06F 16/2365 |
| 2021/0149865 A1* | 5/2021 | Wu | ..................... | G06F 16/2272 |
| 2023/0081900 A1* | 3/2023 | Werner | .............. | G06F 16/2379 |

OTHER PUBLICATIONS

Tutorialspoint: simplyeasylearning. "Elasticsearch—Basic Concepts" https://www.tutorialspoint.com/elasticsearch/elasticsearch_basic_concepts.htm.

* cited by examiner

*Primary Examiner* — Ryan Bertram
(74) *Attorney, Agent, or Firm* — M&B IP Analysts, LLC

(57) ABSTRACT

A method and system for live migration of an index in a document store are provided. The method includes creating a new index based on a change request, wherein the change request designates at least one change relative to a current index, wherein the new index includes all mappings and settings of the current index together with the at least one requested change, wherein the new index and the current index are properties of the document store; initiating a reindexing process of the new index by copying documents from the current index to the new index, wherein the current index remains active during the reindexing of the new index; and upon successful completion of the reindexing process, deleting the current index and directing all write and read requests to the new index.

15 Claims, 8 Drawing Sheets

LIVE DATA MIGRATION IN DOCUMENT STORES

TECHNICAL FIELD

The present disclosure generally relates to document stores, more specifically to techniques for providing live data migration in document-type data stores.

BACKGROUND

As demand for data and use of web applications increases, traditional relational databases (e.g., SQL based databases) cannot efficiently support the volume of stored data, the low latency for data retrieval, and the high scale required by such applications. To resolve such deficiencies, the industry has turned to document-type data stores, or document stores.

Document stores are one of the main categories of NoSQL databases. Document stores contrast with the traditional relational database (RDB). Such databases generally store data in separate tables that are defined by a programmer, and a single object may be spread across several tables. Document stores are designed to store all information for a given object in a single instance in the database, and every stored object can be different from the rest. This eliminates the need for object-relational mapping while loading data into the database. The document stores are also designed to offer a richer experience with modern programming techniques. Popular document stores include, for example, MongoDB®, CouchDB®, OpenSearch by AWS®, ElasticSearch®, and the like. ElasticSearch, for example, is a scalable and real-time search and analytics engine that provides domain-specific language (DSL) full querying based on JSON. Other document stores allow querying using CSV and XML formats.

Document stores use different schema (notations) to store or otherwise retrieve data. For example, in Elasticsearch which is a popular document store, the index is similar to tables in a traditional relational database (RDB). Every table is a collection of rows, just as every index is a collection of documents in a document store. Further, a document and field in a typical document store are respectively a row and column in a RDB.

One of the disadvantages of document stores is data migration and, in particular, live data migration. That is, updating index schemas of a document store now requires shutting down an access to an application or applications utilizing the migrated data during the migration process. In a typical scenario, such a process is prolonged and depends on the number and/or type of changes made to the schema. For example, modifying or deleting a field requires creation of a new index (with a new schema) and copying the data to the new index. When data is copied, no access is allowed to the index, hence the document store. This is not a feasible option for applications in a production environment.

Furthermore, data migration solutions should meet data integrity and stateful requirements, so no data will be lost during the migration. Currently there are no solutions that can meet these requirements when providing data migration in document stores.

It would therefore be advantageous to provide a solution that would overcome the deficiencies noted above by providing an efficient live data migration solution for document stores.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for live migration of an index in a document store. The method comprises creating a new index based on a change request, wherein the change request designates at least one change relative to a current index, wherein the new index includes all mappings and settings of the current index together with the at least one requested change, wherein the new index and the current index are properties of the document store; initiating a reindexing process of the new index by copying documents from the current index to the new index, wherein the current index remains active during the reindexing of the new index; and upon successful completion of the reindexing process, deleting the current index and directing all write and read requests to the new index.

Certain embodiments disclosed herein include a system for live migration of an index in a document store, comprising: a processing circuitry; and a memory, the memory containing instructions that, when executed by the processing circuitry, configure the system to: create a new index based on a change request, wherein the change request designates at least one change relative to a current index, wherein the new index includes all mappings and settings of the current index together with the at least one requested change, wherein the new index and the current index are properties of the document store; initiate a reindexing process of the new index by copying documents from the current index to the new index, wherein the current index remains active during the reindexing of the new index; and upon successful completion of the reindexing process, delete the current index and directing all write and read requests to the new index.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
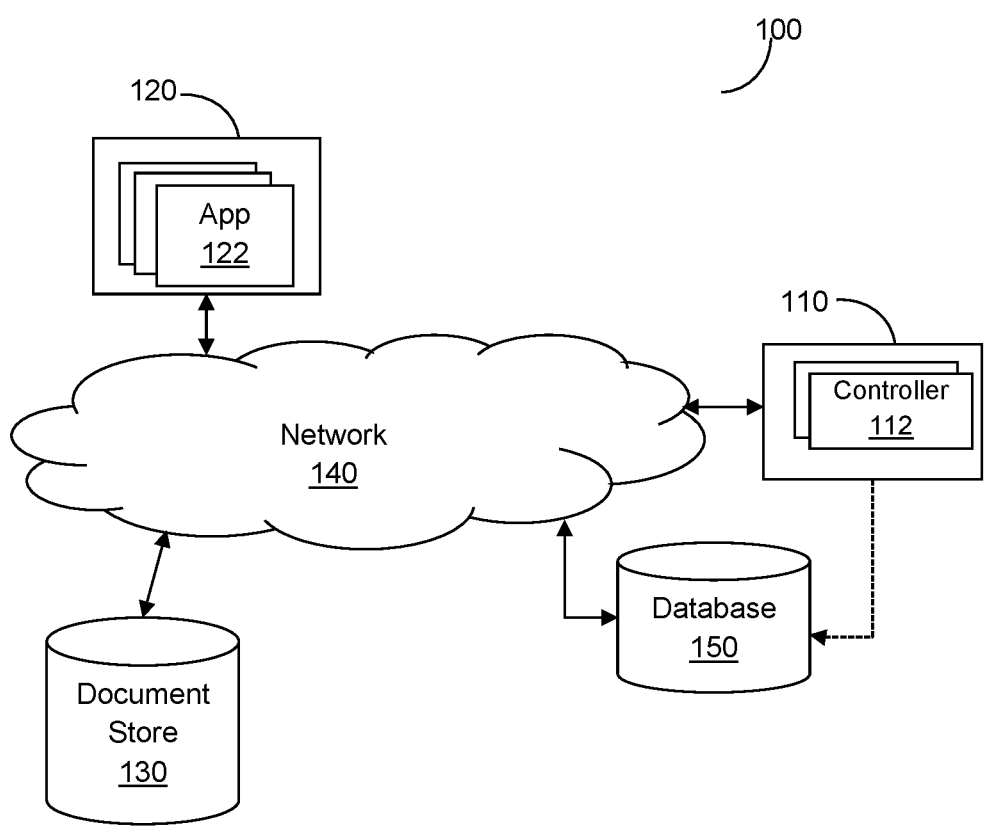
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments present a system and method for live data migration in document stores. Specifically, the disclosed embodiments enable updating schema of a document store without any downtime for any applications accessing the data stores. Further, the disclosed embodiments enable the live migration while maintaining data integrity, security, and stateful of the document store. In one configuration, data in a document store is stored per tenant. That is, an index is not shared between two or more tenants. This ensures data isolation in the document store, and such isolation is also maintained when the index is updated.

By way of example, the disclosed embodiments include creating a new index of a document store based on a change request designating at least one change relative to a current index of the same document store. In an embodiment, the new index includes all mappings and settings of the current index and at least one requested change. Then, a reindexing process is initiated by copying documents from the current index to the new index. During the reindexing process, the current index remains active during the reindexing of the new index. This allows an application to access the current index to read or write data from and to the document store, thereby the application does not experience downtime. Thus, the disclosed embodiments improve the response time of applications and further increase security as no data is lost during the migration.

FIG. 1 shows an example network diagram 100 utilized to describe the various disclosed embodiments. In the example network diagram 100, a migration server 110, an application server 120, and a document store 130 are connected to a network 140. In a certain configuration, at least one database 150 is connected to the network 140 or alternatively coupled to the migration server 110.

The network 140 may be but is not limited to, a wireless, cellular or wired network, a local area network (LAN), a wide area network (WAN), a metro area network (MAN), the Internet, the worldwide web (WWW), similar networks, and any combination thereof. The application server 120 is configured to execute one more applications 122, such as, but not limited to, web applications, cloud applications, legacy applications. The applications 122 read and write data from the document store 130. The application server 120 is further configured to send metadata to the migration server 110, and receive from the migration server 110 index topology of the document store 130.

The document store 130 is any type of non-relational (NoSQL) database configured to store all information for a given object as a single instance. The document store 130 may include, for example, MongoDB®, CouchDB, OpenSearch by AWS, ElasticSearch®, and the like. The applications 122 can access data stored in the document store 130 based on an index topology provided by the migration server 110. The data stores in the document stores may include any type of data including, but not limited to, audio recordings, video recordings, textual data, images, and the like. For example, the document store 130 maintains CRM information, email messages, and sale call recordings of various customers. In an embodiment, data of different customers is separated in the document store 130 by maintaining different indexes (or indices) for each customer (tenant) per document type.

In comparison, to the document store 130, the database 150 is a relational database utilized to store index topologies and schema versions of the document store 130 and state of data migration. In one configuration, the database 150 may include an in-memory data store to cache certain indexes and topology information to allow fast access of such data by the migration server 110. The information in the database 150 serves a single source of truth of all indexes of the document store 130. In case of a failure in the migration process, indexes can be restored from the database 150. The contents of the database 150 may be updated throughout the migration process.

The migration server 110 is configured to perform the disclosed embodiments for live data migration in the document store 130. That is, the migration server 110 is configured to update indexes of the document store 130 without any downtime of the application 122. As will be elaborated below, the migration server 110 is configured to perform the live data migration with accuracy and consistency, and without compromising security.

Figure 5:
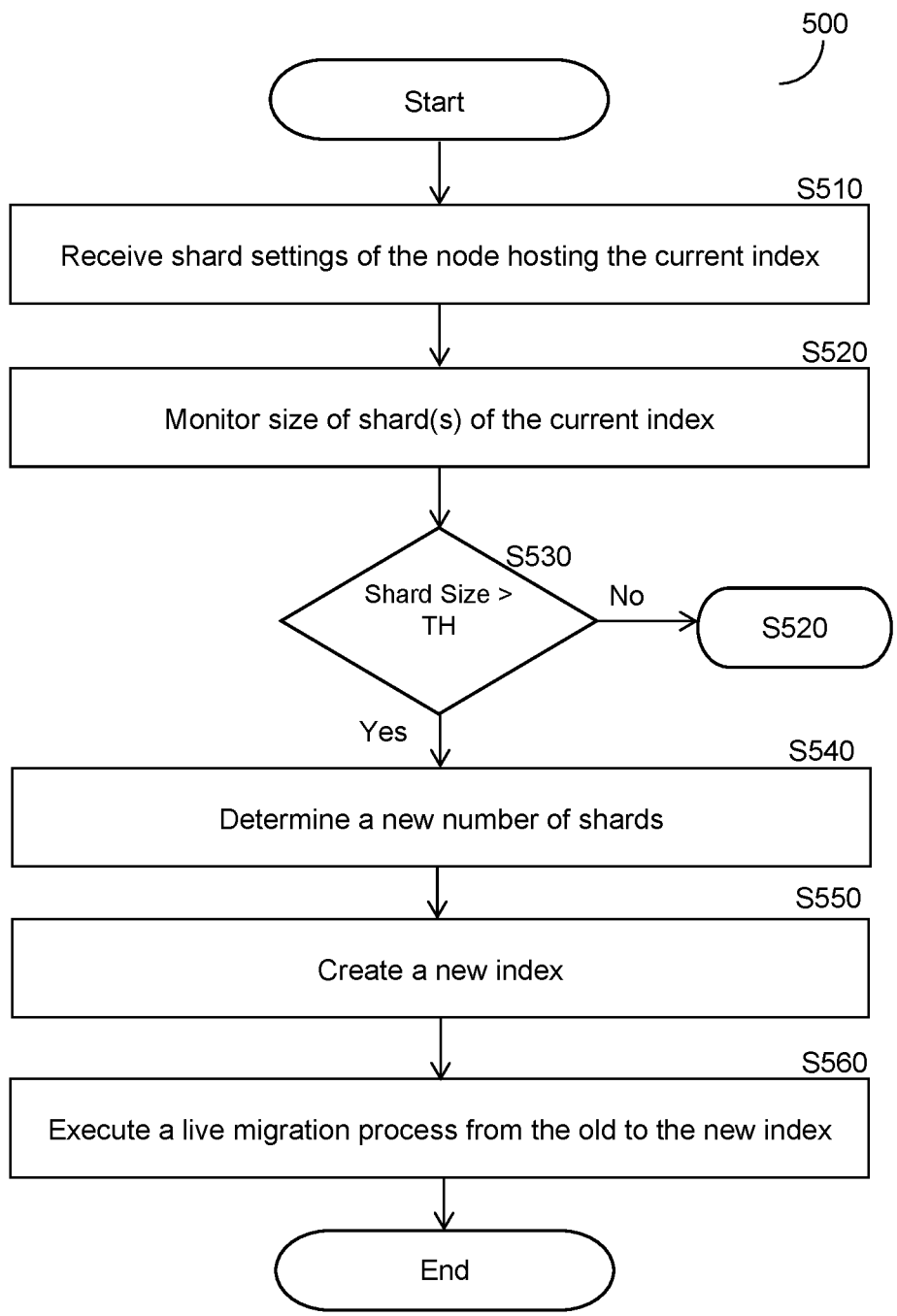
FIG. 5 is a flowchart illustrating a method for resharding using live data migration in document stores according to an embodiment.

In an embodiment, the migration server 110 is configured to execute one more controllers (hereinafter referred to individually as a controller 112 and collectively as controllers 112). A controller 112 may be realized as a virtual entity executed over the migration server 110. An example for such a virtual entity includes a virtual machine, a microservice, a software container, and the like. In some configurations, the controller 112 may be realized as a hardware component (e.g., a processor) configured to execute software and/or firmware. An example hardware diagram of the migration server 110 is shown in FIG. 5. The migration server 110 may be realized, in some configurations, as a virtual machine.

In an embodiment, the controllers 112 are configured to manage the access to the document store 130 and the migration process. To write or read data from a specific index, an application 122 sends a request to the controller 112 with metadata on the customer (tenant) and document type prior to querying the document store 130. The controller 112, in response, returns the index topology to the requesting application 122. Using the index topology, the application 122 can write or query the document store 130. It should be noted that multiple controllers 112 are utilized to serve multiple applications 122, and the requests to controllers 112 can be load balanced.

According to the disclosed embodiments, the migration server 110 can execute one or more controllers 112 to perform the migration process. A migration is required when an index (of a tenant) requires some changes. Such changes can be determined, for example, by a programmer of an application 122. A change to an index may include adding or removing a document (equivalent to a row in an RDB), adding or removing a field (equivalent to a column in an RDB), creating or deleting new shards, changing a document type, and so on. Typically, any change to an index requires copying (i.e., migrating) data from an "old" index to a "new" index, where the new index is a modified index. As noted above, such migration should be performed without downtime, so that the application can read from or write to the document store 130 (based on the index) during the migration.

In an embodiment, the migration server 110 is configured to change the old index so that an application 122 can read and/or write to the old index based on the new configuration. The migration server 110 is further configured to create the new index and copy mappings, settings, and documents (data) from the old index to the new index. New data is written to the old index until the copying process is completed. Once the new index is ready (all data is copied), the old index is deleted, and all read/write actions are performed from the new index.

It should be noted that although one migration server 110, one application server 120, and one document store 130 are depicted in FIG. 1 merely for the sake of simplicity, the embodiments disclosed herein can be applied to a plurality of servers and document stores of the same or different types. The elements shown in FIG. 1 may be located in different geographical locations. Further, the migration server 110, application server 120, document store 130 may be part of one or more datacenters, server frames, or a cloud computing platform. The cloud computing platform may be a private cloud, a public cloud, a hybrid cloud, or any combination thereof.

Figure 2:
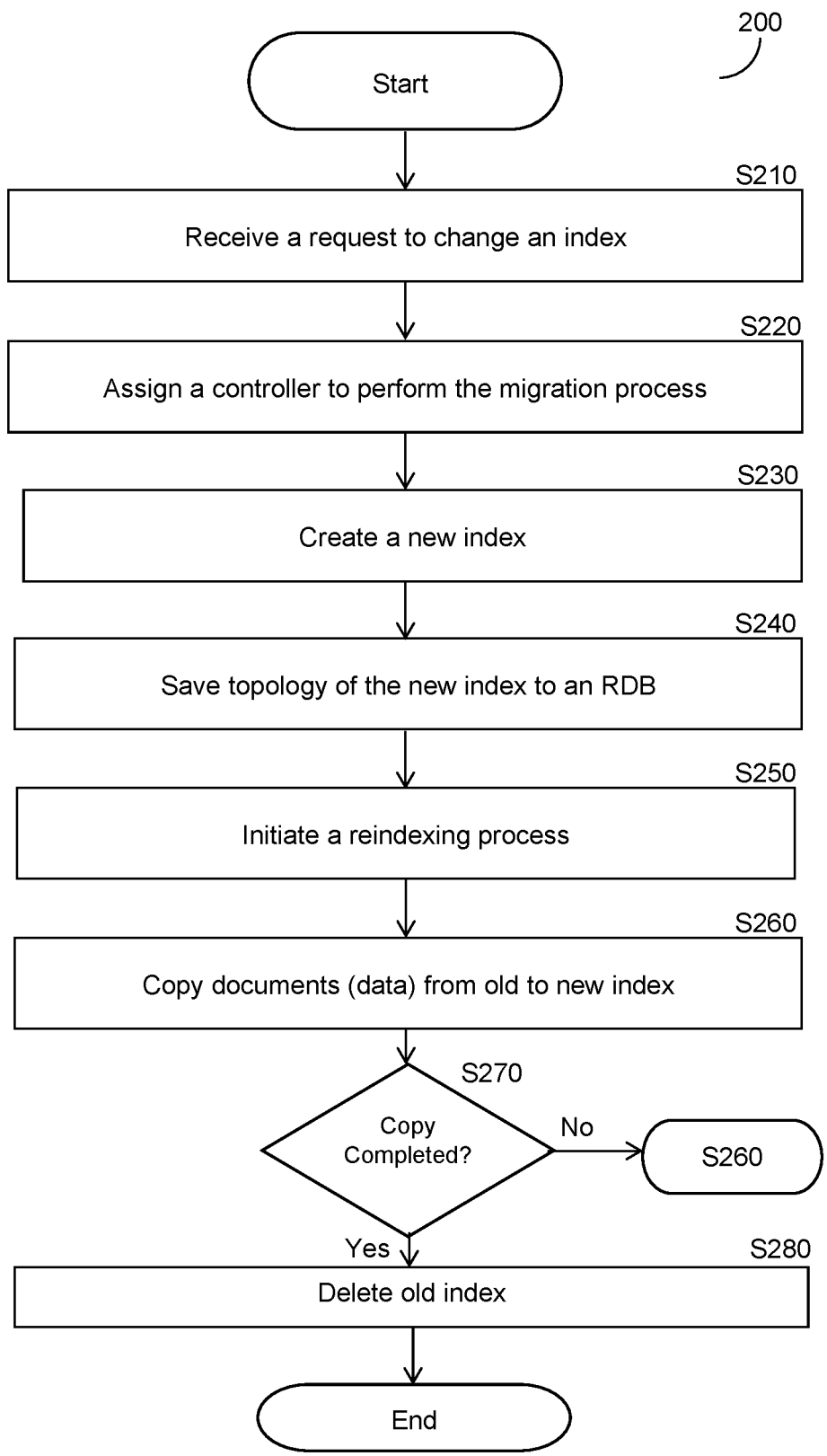
FIG. 2 is a flowchart illustrating a method for live data migration in document stores according to an embodiment.

FIG. 2 is an example flowchart 200 illustrating the live migration process of an index in a document store according to an embodiment. At S210, a request to change an index associated with a tenant is received. The request may include an index identifier, a current index topology, a tenant ID, and the requested change. As noted above, a change to an index may include adding or removing a document, adding or removing a field, creating or deleting new shards, changing a document type, and so on. The request may be determined by a user (e.g., programmer). The request may be generated by an external system, for example, an application requesting an index change.

At S220, a controller (e.g., controller 112) is assigned to perform the migration process for the requested new index. In an embodiment, a single controller is assigned to control the migration process (task), so that no read or write operation will be performed against the new index during the migration. Further, as noted above, an index is per tenant index. A new controller may be instantiated when there is no controller available.

At S230, a new index is created based on the request's specification. In an embodiment, if the request designates changes relative to a current (old) index, the new index is generated with the same topology and mappings of the old index, and those requested changes are performed relative to such topology and mappings. For example, if the requested change is to add a new field to the old index, the new index is created to include the same topology and settings of the old index. Then, the field is added.

The topology defines a structure of the index such as, for example, fields, documents, shards, and so on. The settings may relate to the index and to the document store holding the index. For example, in the Elasticsearch settings related to the index may include the size, a number of shards, a number of replicas, and so on. The store's setting may include a cluster stetting and a node setting.

At S240, the topology and settings of the newly created index are saved in a relational database, e.g., the database 150, FIG. 1. It should be noted that the database used to store information in S240 is not the document store of which the migration is performed.

At S250, once the new index is ready and a predefined time window has elapsed, a reindexing process is initiated. The reindexing process is an asynchronous task allowing the old index to remain active throughout the execution of the reindexing process. As such, data is written to both old and new indexes and read from the old index, thereby ensuring that an application can continuously access the data with no downtime. In an embodiment, the execution of the reindexing task happens after a predefined time window to allow any cached index information of the old index to be cleared or aged. The cached index information may include at least the index name and the hosting cluster (at the document store) connection details. Such information is cached by the application or the database 150.

At S260, the reindexing is performed by polling (or reading) data from the old index and writing the data to the new index. The data in a typical document store includes documents. In an embodiment, S260 is managed by the assigned controller and performed by a cluster of the document store.

At S270, it is checked if the reindexing tasks are completed. That is, if the entire data has been transferred from the old index to the new index. The check for completion of the tasks may be performed every predefined time interval. If so, execution continues with S280; otherwise, execution returns to S260.

It should be noted that during the execution of the reindexing task (S260 and S270), data is written to both old and new indexes and read from the old index, thereby ensuring that an application can continuously access the data with no downtime. Specifically, in order to write data, an application sends to the assigned controller a request (REST call) to write to the document store. The request includes metadata (e.g., tenant name and document type). Then, the topologies of both old and new indexes are returned to the requesting application, allowing such application to write the information to both indexes. When the request is to read the data, the topology index of only the old index is returned.

At S280, when the reindexing process is completed, the old index is deleted. In an embodiment, the deletion of the old index occurs only after a predefined time window, to ensure data consistency. That is, a predefined time window is required to clear any cached data of the old index.

At the conclusion of S280, any read, write or any other operation will be directed to the new index.

Figures 3A, 3B:
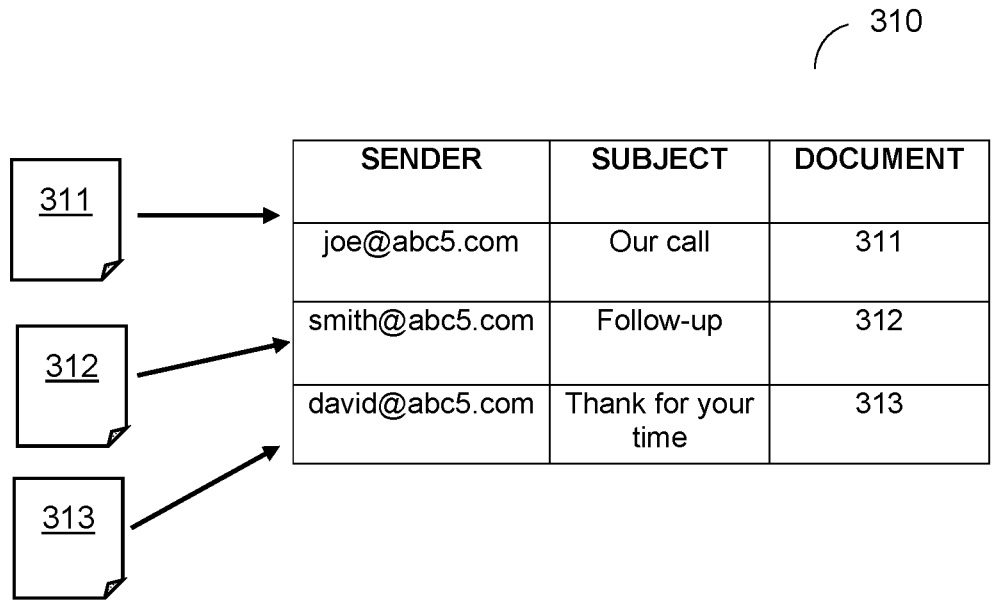
FIGS. 3A-D are schematic diagrams of indexes demonstrating the live data migration process according to an example implementation.

FIGS. 3A through 3D are example diagrams illustrating the live migration process according to the disclosed embodiments. FIG. 3A shows a current index 310 stored in a document store. The index 310 is a data structure that stores a mapping from content to its locations in a document or a set of documents. In the example shown in FIG. 3A, there are 3 documents 311, 312, and 313, where the fields in the index 310 are date, customer name, and document, providing a mapping to the actual document. The values of the "sender" and "subject" are mentioned in the documents 311-313, which may include emails.

A request to change the index to include a field "receipt data" to indicate if a document (email) is an offer letter. The new index 320 is shown in FIG. 3B to include the same fields and mappings as the index 310, with the additional field "OFFER LETTER".

Figure 3C:
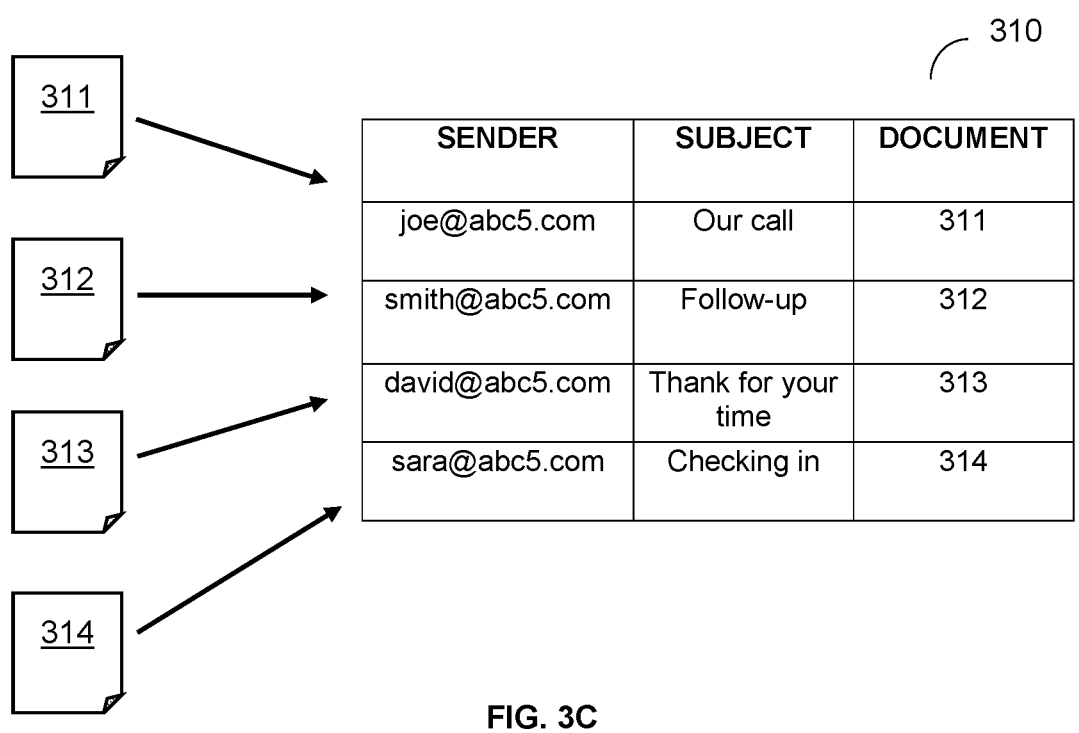
Figure 3D:
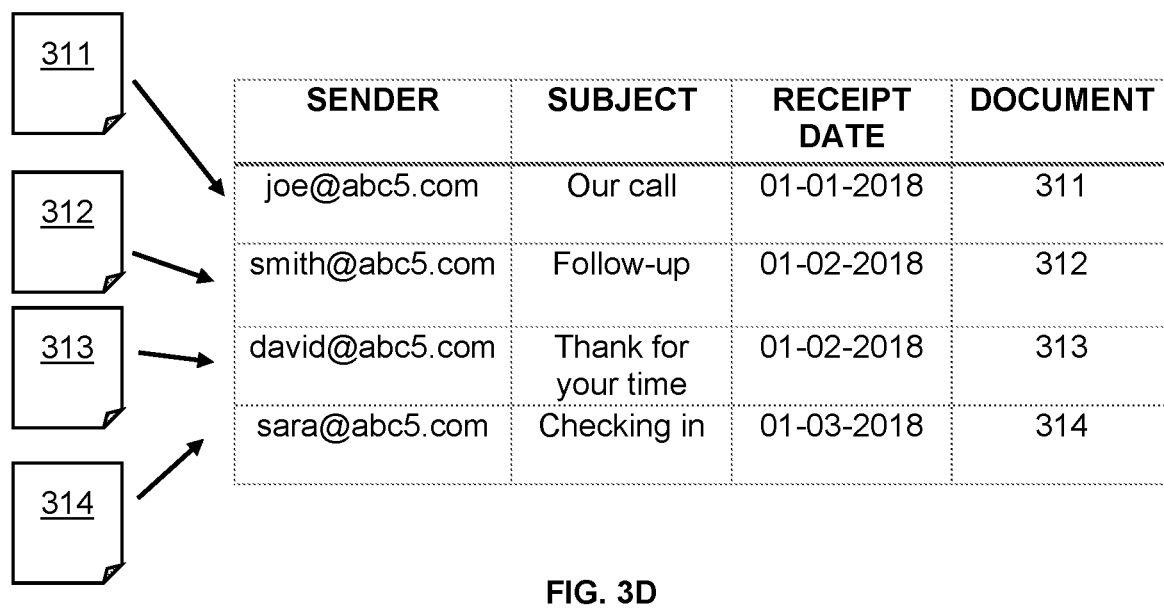

FIG. 3C a first step of the reindexing tasks where documents 311 and 312 are copied to the new index. FIG. 3D shows a new document 314 that has been received during the reindexing tasks. As demonstrated, this email is written to the index 310, the old index. FIG. 3E shows the state of the new index 320 at the end of the indexing process. As demonstrated, all documents are copied to the index 320.

It should be noted that thought all the indexes 310 and 320 are depicted as a tubular data structure, this is only for illustrative purposes. It should be further noted that some changes may made in place, i.e., changes may be included in the index 310.

Figure 4:
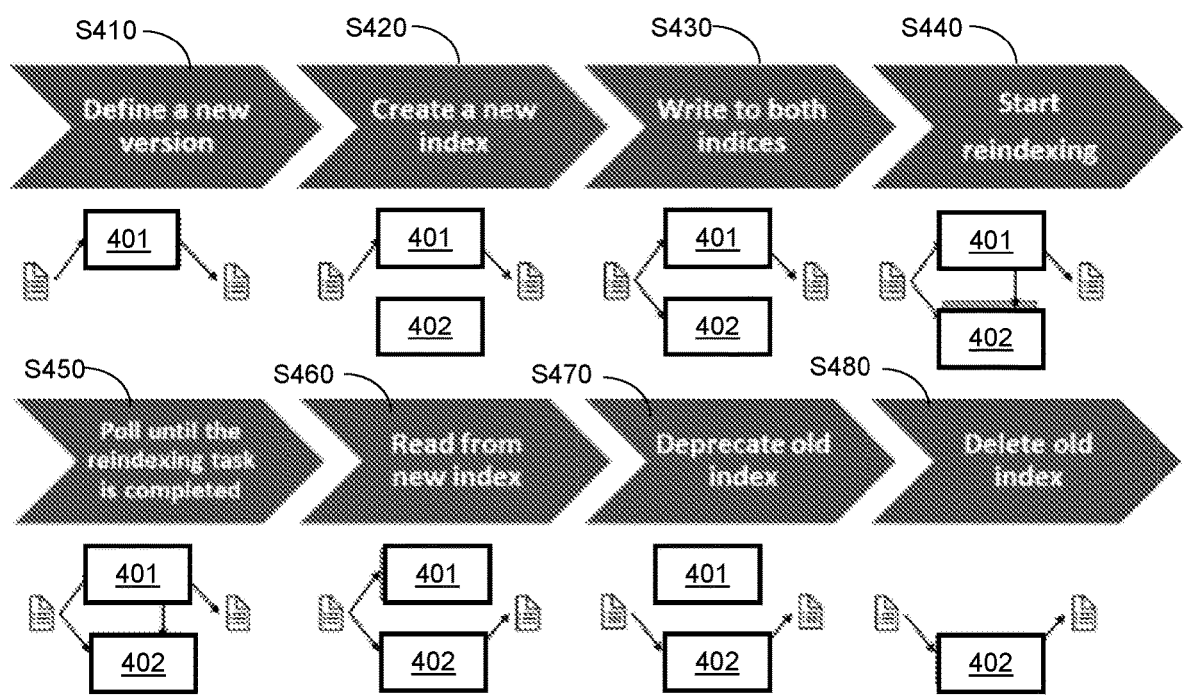
FIG. 4 is a flow diagram demonstrating the live migration process while allowing access to the indexes, according to an embodiment.

FIG. 4 shows an example flow diagram 400 demonstrating the live migration process while allowing access to the indexes, according to an embodiment.

At S410, a new definition of an index 402 is received. The new index 402 is defined with the same mappings and settings as an index 401 (a current index), except an additional field.

At S420, the new index 402 with the new version is created. As noted above, this is performed using a controller assigned to migrate the index. Both indexes 401 and 402 are assigned to the same tenant.

At S430, a new document (D1) is written to both indexes 401 and 402. The parallel writing operation is controlled by only one controller (e.g., controller 112) configured to change the index topology at any given time.

At S440, a reindexing process is initiated after a predefined time window has been elapsed. The reindexing is an asynchronous process.

At S450, throughout the reindexing process, documents ae copied from the index 401 to index 402. This may include polling documents mapped to the index 401 and copying such indexes to the new index 402. In an embodiment, the reindexing process is performed by a cluster of document store. To monitor the progress of the reindexing process, the task identifier (ID) of such process is retrieved, and the cluster is queried at a predefined time intervals if the task has been completed.

At S460, a request to read is received and being executed against the new index 402. The index 402 is active index when the reindexing process is successfully completed.

At S470, the old index 401 deprecated after waiting a predefined time window requires to clear all cached data. At S480, the old index 401 is deleted.

The disclosed embodiments also allow for automatic sharding of indexes in the document store. A database shard, or simply a shard, is a horizontal partition of data in a document store, database, or search engine. Each shard is held on a separate database server instance, to spread the load. Some data within a shard remains present in all shards, but some appears only in a single shard. Each shard acts as the single source for this subset of data. For example, in Elasticsearch, each shard can be placed on a different server, and thus, the data can be spread among the cluster nodes. An index can be composed of different shards. Thus, when a query to an index is built from multiple shards, such query can be sent to each relevant shard and merges the result in such a way that the querying application does not require the shards' locations.

The size of the shards is determined by the number of allowed shards in a node and the size of an index. For example, if an index includes 200 documents and the number of shards is 4, the size of each of shard is 50 documents. The number of shards is configured as part of the document store's settings.

FIG. 5 is an example flowchart illustrating a method for resharding an index using a live data migration in document stores according to an embodiment. The method may be controlled and automatically triggered by the migration server 110, FIG. 1.

At S510, a setting including at least a current number of shards and an optimal shard size are received. Such settings may be of a node hosting the current index. The optimal shard size may be determined as the number of allowed documents. The number of shards is an integer number greater or equal to 1.

At S520, the size of each shard of the current index is monitored. In an embodiment, S520 may include checking the number of documents maintained in each shard at a predefined time interval (e.g., 1 hour). Typically, documents are equally divided among shard(s) of an index, thus the check of the size can be performed for a single shard only. In an embodiment, S520 is performed by a controller assigned to manage the current index.

At S530, it is determined if a size of the shard is greater than the optimal size threshold (TH) set for a shard. If so, execution continues with S540; otherwise, execution returns to S520.

At S540, a new number of shards for the current index is determined. The new number is higher than the current number of shards. In an embodiment, the new number is increased by a predefined number or factor. For example, the number of shards can be increased by 1 or by multiplying the current number of shards by a factor of 2. In another embodiment, a process may be implemented to determine the number of needed shards based on past growth of the index. For example, if in the past week, the number of documents in the index doubled, the number of new shards would be increased by a factor of 2.

At S550, a new index is created based on the same mappings of the current and with the number of shards as the index settings. That is, the index topologies would remain the same for both the same and old index, and the new index is set with the new number of shards.

At S560, a live migration process is performed to transfer data from the current index to the new index. The live migration process is performed, as discussed in detail above with reference to FIG. 2. The distribution of the documents among the shards is performed by the document store.

It should be noted that the disclosed embodiments have been discussed with a reference to a specific notation (document, field, shard, etc.) that is typically adopted by Elasticsearch®. However, it should be noted that the disclosed embodiments are applicable to any type of document store, examples of which are provided below.

Figure 6:
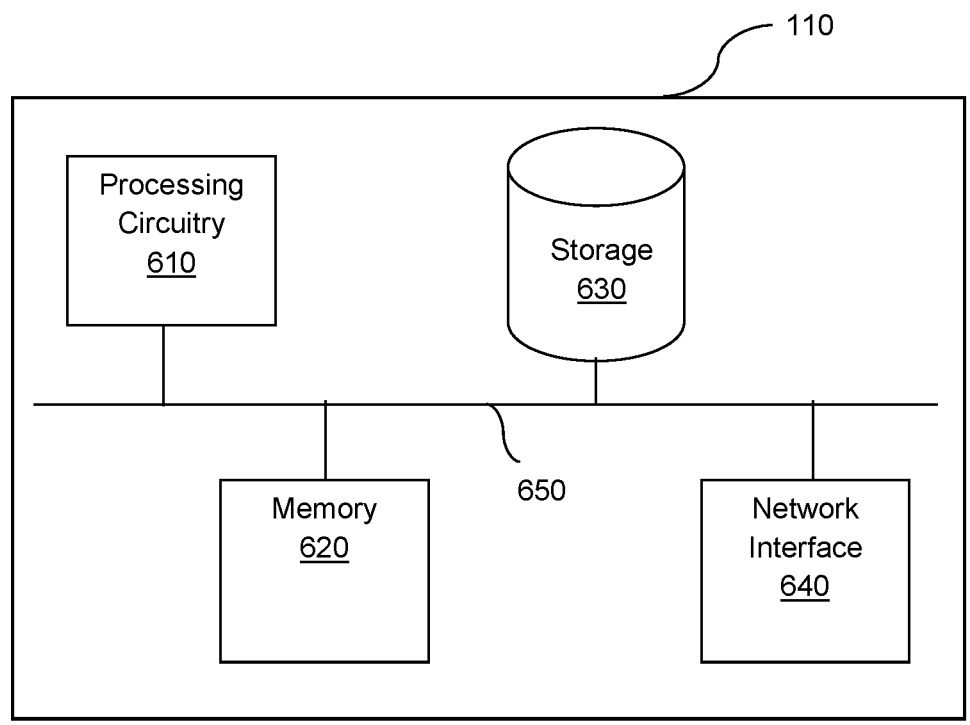
FIG. 6 is a schematic diagram of a migration server according to an embodiment.

FIG. 6 is an example schematic diagram of the migration server 110 according to an embodiment. The migration server 110 includes a processing circuitry 610 coupled to a memory 620, a storage 630, and a network interface 640. In an embodiment, the components of the migration server 110 may be communicatively connected via a bus 660.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the migration server 110 to communicate with the application server 120 and document store 130 for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for live migration of an index in a document store, comprising:
    creating a new index based on a change request, wherein the change request designates at least one change relative to a current index, wherein the new index includes all mappings and settings of the current index together with the at least one requested change, wherein the new index and the current index are properties of the document store;
    initiating a reindexing process of the new index by copying documents from the current index to the new index, wherein the current index remains active during the reindexing of the new index;
    upon successful completion of the reindexing process, deleting the current index and directing all write and read requests to the new index, wherein all write requests are directed to both the new index and to the current index during the reindexing process, wherein all read requests are directed only to the current index during the reindexing process;
    assigning a single controller to control the reindexing process;
    responding, by the controller, with a topology of the current index for any read request; and
    responding, by the controller, with a topology of the current index and a topology of the new index for any write request.

2. The method of claim 1, wherein initiating the reindexing process further comprises:
    waiting for a predefined time prior to initiating the reindexing process to allow aging of any cached data.

3. The method of claim 1, wherein the reindexing process further comprises:
    polling documents from the current index during a first time window;
    copying the polled documents to the new index;
    checking if all documents from the current index are copied to the new index; and
    repeating the reindexing process until all documents are copied to the new index, wherein the successful completion of the reindexing process occurs when all documents in the current index are copied to the new index.

4. The method of claim 1, further comprising:
    waiting for a predefined time prior to deleting the current index to allow aging of any cached data and backing up the current index when successful completion of the reindexing process has occurred.

5. The method of claim 1, further comprising:
    resharding the current index.

6. The method of claim 5, wherein resharding the current index further comprises:
checking if a size of each shard defined in the current index exceeds an allowable size of the shard;
determining a new number of shards based on the current index, wherein the new number of shards is higher than a current number of shards defined for the current index;
creating a new index based on same mappings of the current index, wherein the new index is set with the determined new number of shards; and
migrating the current index to the new index, wherein the current index remains activate during the migration store.

7. The method of claim 1, wherein the document store is a non-traditional relational database (RDB).

8. A non-transitory computer readable medium having stored thereon instructions for causing a processing circuitry to execute a process for live migration of an index in a document store, the process comprising:
creating a new index based on a change request, wherein the change request designates at least one change relative to a current index, wherein the new index includes all mappings and settings of the current index together with the at least one requested change, wherein the new index and the current index are properties of the document store;
initiating a reindexing process of the new index by copying documents from the current index to the new index, wherein the current index remains active during the reindexing of the new index;
upon successful completion of the reindexing process, deleting the current index and directing all write and read requests to the new index, wherein all write requests are directed to both the new index and to the current index during the reindexing process, wherein all read requests are directed only to the current index during the reindexing process;
assigning a single controller to control the reindexing process;
responding, by the controller, with a topology of the current index for any read request; and
responding, by the controller, with a topology of the current index and a topology of the new index for any write request.

9. A system for live migration of an index in a document store, comprising:
a processing circuitry; and
a memory, the memory containing instructions that, when executed by the processing circuitry, configure the system to:
create a new index based on a change request, wherein the change request designates at least one change relative to a current index, wherein the new index includes all mappings and settings of the current index together with the at least one requested change, wherein the new index and the current index are properties of the document store;
initiate a reindexing process of the new index by copying documents from the current index to the new index, wherein the current index remains active during the reindexing of the new index; and
upon successful completion of the reindexing process, delete the current index and directing all write and read requests to the new index, wherein all write requests are directed to both the new index and to the current index during the reindexing process, wherein all read requests are directed only to the current index during the reindexing process;
assign a single controller to control the reindexing process;
respond, by the controller, with a topology of the current index for any read request; and
respond, by the controller, with a topology of the current index and a topology of the new index for any write request.

10. The system of claim 9, wherein the system is further configured to:
wait for a predefined time prior to initiating the reindexing process to allow aging of any cached data.

11. The system of claim 9, wherein the system is further configured to:
poll documents from the current index during a first time window;
copy the polled documents to the new index;
check if all documents from the current index are copied to the new index; and
repeat the reindexing process until all documents are copied to the new index, wherein the successful completion of the reindexing process occurs when all documents in the current index are copied to the new index.

12. The system of claim 11, wherein the system is further configured to:
wait for a predefined time prior to deleting the current index to allow aging of any cached data and backing up the current index when successful completion of the reindexing process has occurred.

13. The system of claim 9, wherein the system is further configured to:
reshard the current index.

14. The system of claim 13, wherein the system is further configured to:
check if a size of each shard defined in the current index exceeds an allowable size of the shard;
determine a new number of shards based on the current index, wherein the new number of shards is higher than a current number of shards defined for the current index;
create a new index based on same mappings of the current index, wherein the new index is set with the determined new number of shards; and
migrate the current index to the new index, wherein the current index remains activate during the migration store.

15. The system of claim 9, wherein the document store is a non-traditional relational database (RDB).

* * * * *